United States Patent [19]

Paynter

[11] 3,941,716

[45] Mar. 2, 1976

[54] PROCESS FOR REACTIVATION OF IRIDIUM-CONTAINING CATALYSTS

[75] Inventor: John D. Paynter, Louisville, Ky.

[73] Assignee: Exxon Research and Engineering Company, Linden, N.J.

[22] Filed: Aug. 16, 1973

[21] Appl. No.: 388,908

[52] U.S. Cl................................ 252/415; 208/140
[51] Int. Cl.$^2$................ B01J 23/96; C10G 35/08
[58] Field of Search....................... 252/415; 208/140

[56] References Cited
UNITED STATES PATENTS

| | | | |
|---|---|---|---|
| 2,880,168 | 3/1959 | Feller.................................. | 208/140 |
| 2,980,631 | 4/1961 | Craig................................... | 208/139 |
| 3,117,076 | 1/1964 | Brennan et al. .................... | 208/140 |
| 3,134,732 | 5/1964 | Kearby et al. ...................... | 208/140 |
| 3,554,902 | 1/1971 | Buss.................................... | 208/139 |
| 3,625,860 | 12/1971 | Condrasky........................... | 252/415 |
| 3,637,524 | 1/1972 | Johnson et al....................... | 252/415 |
| 3,673,109 | 6/1972 | Georgescv et al. ................. | 252/415 |
| 3,684,693 | 8/1972 | Sinfelt................................. | 208/138 |
| 3,707,509 | 12/1972 | Georgescv et al. ................. | 208/139 |
| 3,764,557 | 10/1973 | Kluksdahl........................... | 252/415 |

*Primary Examiner*—Winston A. Douglas
*Assistant Examiner*—P. E. Konopka
*Attorney, Agent, or Firm*—Llewellyn La. Proctor

[57] ABSTRACT

In a process for redispersion of the iridium agglomerates (irridium and/or iridium oxide) of a deactivated iridium-containing catalyst, especially a platinum-iridium catalyst, in ferrous metal equipment, wherein the agglomerated iridium, or agglomerated platinum and iridium, is redispersed and the catalyst reactivated by sequential prereduction-halogen treatments, the improvement comprising adding and maintaining small amounts of water with the halogen to suppress ferrous metal corrosion and catalyst contamination during the required treatment with halogen.

23 Claims, No Drawings

3,941,716

PROCESS FOR REACTIVATION OF IRIDIUM-CONTAINING CATALYSTS

REFERENCE TO RELATED APPLICATIONS

Reference is made to application Ser. No. 343,304 by D. J. C. Yates, filed Mar. 21, 1974 (which is a continuation-in-part of application Ser. No. 248,603 filed Apr. 28, 1972); application Ser. Nos. 388,742; 388,743; 388,744 by D. J. C. Yates et al, filed Aug. 16, 1973; application Ser. No. 388,741 by J. D. Paynter et al filed Aug. 16, 1973; application Ser. No. 388,746 by J. H. Sinfelt et al, filed Aug. 16, 1973; and application Ser. No. 411,192 by J. H. Sinfelt et al, filed Aug. 16, 1973 (which is a continuation-in-part of Ser. No. 388,746, filed Aug. 16, 1973), all of which relate to the reactivation of iridium-containing catalysts.

Catalytic reforming, or hydroforming, is a process well known to the petroleum refining industry and has been used for improving the octane quality of naphthas and straight run gasolines for decades. In a typical process, a series of reactors, constructed of ferrous metal, are provided with fixed beds of a supported noble metal/halogen catalyst, and each reactor is preceded by a reheat furnace. A naphtha feed, with hydrogen, is co-currently passed sequentially through a reheat furnace and then downflow to the preceding reactor of the series. The vapor effluent from the last reactor of the series is a gas rich in hydrogen, which usually contains small amounts of normally gaseous hydrocarbons, and it is separated from the $C_5^+$ liquid product and recycled to the process to inhibit coke formation on the catalyst, though overall there is net hydrogen production.

Iridium-containing catalysts, or catalysts comprising composites of platinum and iridium with an inorganic oxide base, particularly alumina, were reported many years ago and are described in U.S. Pat. No. 2,848,377. Though the activity of these catalysts is very high, serious loss of activity occurs quite rapidly due to the tendency of the iridium, when exposed to oxygen at elevated temperatures, to form larger aggregates, or agglomerates; and, as the size of the agglomerates increases, there results a progressive decline in catalyst activity. X-ray diffraction patterns taken, e.g., on fresh, or carefully reactivated, platinum-iridium catalysts thus fails to show any significant lines corresponding to platinum, or iridium, this indicating that platinum and iridium are present in very finely dispersed atomic forms. X-ray diffraction patterns taken on the same catalyst used in reforming, from which the coke has been burned, not only shows the presence of platinum and iridium, but also agglomerates of relatively large or massive crystals of a size (length of a side of an assumed cubic crystallite) in excess of about 50A and even 150A, and greater. The crystallite size of the platinum is sharply contrasted with the state of dispersion of the platinum on fresh catalysts which is shown by carbon monoxide chemisorption techniques to range in average size to a maximum of about 11 or 12A. (See *J. of Catalysis*, 8 348, 1967 by D. J. C. Yates and J. H. Sinfelt.) Iridium metal not only exhibits similar behavior but, additionally, possesses an acute tendency to agglomerate into large crystallites which contain iridium oxide in admixture with the agglomerated metal. The activity of such catalysts is substantially lowered as a result of the loss of metal dispersion on the catalytic surface.

The iridium-containing catalyst must be periodically regenerated to remove coke which forms on the catalytic surfaces, since deposited coke shields the active sites from the reactants and results in catalyst deactivation. Regeneration is accomplished by burning the coke from the catalyst. In burning coke from the catalyst, a moderately high or high temperature, oxygen environment is required at which conditions iridium metal agglomeration, and iridium oxide formation (wherein the iridium oxide generally forms in admixture with the metal) becomes particularly acute, and redispersal of the metal, or metals, is essential to reactivate the catalyst.

Satisfactory techniques have only recently been discovered for redispersing iridium and iridium oxide containing agglomerates. In accordance with these procedures, it has been found that the agglomerates of iridium-containing catalysts can be redispersed, and the deactivated catalyst thereby reactivated, by sequential (a) pre-reduction, preferably with hydrogen, (b) with subsequent contact of the reduced catalyst with halogen, or halogen-containing gaseous mixtures, e.g., chlorine or chlorinecontaining gaseous mixtures, which may or may not contain oxygen. Of the techniques described, multiple cycle treatments of (a) pre-reduction and (b) halogen contacts are most preferred in reactivation of the iridium-containing deactivated catalysts. Whereas these techniques have proven effective in redispersing iridium agglomerates, particularly the multiple cycle treatments which can, in varying degrees of effectiveness, completely redisperse the iridium agglomerates, the sequential prereduction-halogen treament cycle, and use of large amounts of halogen, can cause some particularly troublesome corrosion problems with conventional ferrous metal reactors, and auxiliary process equipment—viz., inlet pipes, condensers, pumps, etc.—as well as iron catalyst contamination problems.

The present invention is concerned with improvements in a process for redispersing the iridium agglomerates (iridium or iridium oxide, or both) of a deactivated iridium-containing catalyst, especially platinum and iridium metals containing catalysts, in ferrous metal process equipment, wherein the agglomerated iridium (or, e.g., agglomerated iridium and platinum) is redispersed and the catalyst reactivated by sequential prereduction-halogen treatments such as is practiced in reactivation of iridiumcontaining catalyst deactivated during catalytic reforming in improving the octane quality of $C_5^+$ naphtha or gasoline, supra, this improvement comprising adding and maintaining small amounts of water within the halogen to suppress ferrous metal corrosion and contamination during the required treatment with halogen.

It is found that water can be added to the halogen in concentration ranging from about 0.1:1 to about 15:1, and higher, and preferably from about 0.4:1 to about 3.0:1, molar ratio of water:halogen to suppress or prevent ferrous metal corrosion, and contamination. Whereas it is found that water to some extent suppresses, or retards, the rate of redispersion of the agglomerated iridium, this slight adverse effect is off-set by the advantages achieved by suppression or prevention of ferrous metal corrosion, and contamination. The water:halogen molar ratios required for optimum effectiveness is affected by the manner in which the water and halogen are added to the ferrous metal zone which contains the deactivated catalyst. The lower water:- halogen molar ratios thus appear more effective in suppressing ferrous metal corrosion when some water is introduced into the ferrous metal zone prior to introduction of the water-halogen admixture, as contrasted with the introduction of similar concentration of water and halogen as separate components, or even as admixtures of water and halogen wherein the water and halogen are introduced without prior introduction of water. In the preferred mode of practicing the invention, therefore, water is pre-introduced prior to addition of the water-halogen admixture for a time sufficient to assure that the ferrous metal surfaces of the reaction zone are adequately wetted, this requiring generally from about 0.25 to about 4 hours, or more. Suitably, following pre-reduction, the desired amount of water is added, generally in admixture with a nonreactive or inert gas and subsequently the halogen is cut in in the amount required to provide the desired water:halogen molar ratio. It is desired to use as little water as possible in the water-halogen mixture consistent with the overall objective of suppressing ferrous metal corrosion, such that retardation of the rate of redispersion is suppressed to no greater extent than necessary. Whereas such variables as the temperature of redispersion, the nature and relative concentration of the hydrogenation-dehydrogenation components constituting the agglomerates, the physical size of the agglomerates, the nature and concentration of halogen employed in the treating gas mixture, and the like, will cause some variation of the molar ratios employed in the water:halogen equilibrium mixtures, in most instances, it appears that the optimum molar ratio of water:halogen in water-halogen admixtures ranges from about 1:1 to about 2:1, and preferably from about 1.2:1 to about 1.6:1. Since water retards the rate of dispersion of iridium agglomerates, it may be desirable in some instances to dry the catalyst bed prior to contact with the moisture-containing chlorine. When the catalyst beds are pre-dried, the front part of the dry bed of catalyst, however, tends to soak up much of the moisture from the incoming chlorine/water mixture, leaving relatively dry chlorine to contact the middle and exit portions of the bed. In other words, the rate of redispersion of the agglomerated metal is optimized for the exit portion of the bed wherein it is most needed, and yet ferrous metal surfaces at the bed inlet remain fully protected against corrosion and iron carryover. In most procedures for reactivation of reforming catalysts, however, the added cost factor imposed by additional drying steps is not justified. It is not justified in most situations involving multiple-cycle treatments because the agglomerated metal is generally completely redispersed after only about two or three cycles of treatment without the intermediate drying step and, even with intermediate drying, it is not generally desirable to lessen the number of cycles of treatment despite the increased efficiency resultant from drying the catalyst.

It is essential in the practice of the present process to remove coke or carbonaceous deposits from coke fouled catalyst, such as typically occurs in reforming wherein the reforming catalyst becomes fouled with coke or carbonaceous deposits. After this is accomplished, the catalyst is then contacted with a reducing gas and the iridium metal component, or components, and oxides thereof, if any, are reduced, along with any other metal component, or components, which may be present, e.g., platinum metal, or compounds thereof. The purpose of the hydrogen treat is to reduce the metal hydrogenation-dehydrogenation component, or components, to its metallic state. Subsequent halogenation treatment will then more effectively disperse the metals. The purpose of the halogenation treatment, on the other hand, is to reduce the average crystallite size of the hydrogenation-dehydrogenation component of the catalyst, i.e., the iridium or platinum metal component, or both. To restore fresh catalyst activity, substantially all of the iridium must be dispersed to a crystallite size less than about 50A, and preferably to crystallite sizes down in the 11 and 12A range, which approximates essentially atomically dispersed metal, this being generally the metal crystallite size of fresh catalyst.

REGENERATION

In initiating regeneration in a reforming process, one of the series of reactors, provided with ferrous metal surfaces, is shut down, and the reactor, or reactors, is purged to remove reactive vapors, and the regeneration is accomplished in situ or ex situ.

A reactor (constituting a reaction zone) containing a bed of the catalyst, the latter having reached an objectionable degree of deactivation due to coke deposition thereon, is first purged of hydrocarbon vapors with a nonreactive or inert gas, e.g., helium, nitrogen, or flue gas. The coke or carbonaceous deposits are then burned from the catalyst by contact with an oxygen-containing gas at controlled temperature below the sintering point of the catalyst, generally below about 1300°F., and preferably below about 850°F. The temperature of the burn is controlled by controlling the oxygen concentration and inlet gas temperature, this taking into consideration, of course, the amount of coke to be burned and the time desired in order to complete the burn. Typically, the catalyst is treated with a gas having an oxygen partial pressure of at least about 0.1 psi (pounds per square inch), and preferably in the range of about 0.3 psi to about 2.0 psi, to provide a temperature ranging from 575°F. to about 850°F., and preferably from about 575°F. to about 750°F., at static or dynamic conditions, preferably the latter, for a time sufficient to remove the coke deposits. Coke burn-off can be accomplished by first introducing only enough oxygen to initiate the burn while maintaining a temperature on the low side of this range, and gradually increasing the temperature as the flame front is advanced by additional oxygen injection until the temperature has reached optimum. Most of the coke can be readily removed in this way. For example, a catalyst obtained from a conventional reforming operation typically containing from about 1 to 20 weight percent of coke deposited thereon, based on total catalyst, can be depleted of coke in this manner. Generally, the amount of coke can be reduced to as little as about 0.1 weight percent with oxygen partial pressures such as described, requiring generally from about 0.1 to about 48 hours, and preferably from about 0.5 to about 20 hours.

In accordance with the best mode of practicing the present invention, at least two, and generally up to about five, or more, cycles of sequential hydrogen reduction and halogenation treatment are required to reactivate the reforming catalysts to their original state of activity, or activity approaching that of fresh catalyst after coke or carbonaceous deposits have been burned from the catalyst. Preferably, from 2 to about 4 cycles, most preferably 3 cycles, of sequential hydrogen reduction and halogenation treatment are employed, after carbon burn-off, in treating partially agglomerated catalysts resultant from typical coke removal operations. The process of the present invention can, in any event, be properly regarded as a process in itself useful for reactivation of coke fouled, halogen depleted, partially agglomerated catalysts from any source, but particularly such as results from a typical reforming process, or as a reforming process which, after catalyst inactivation and coke burn-off, includes a plurality (at least two) of cycles of sequential hydrogen reduction and halogen treating steps, as follows:

REDUCTION

After the coke burn-off step, oxygen is purged from the reaction zone by introduction of a nonreactive or inert gas, e.g., nitrogen or helium, to eliminate the hazard of a chance explosive combination of hydrogen and oxygen. A reducing gas, particularly hydrogen, or a hydrogen-containing gas, generated in situ or ex situ, is first introduced into the reaction zone and contacted with the coke-depleted catalyst at temperature ranging from about 400°F. to about 1100°F., and preferably from about 650°F. to about 950°F., sufficient to effect reduction of the metal hydrogenation-dehydrogenation component, or components, contained on the catalysts. Pressures are not critical, but typically range between about 5 psig to about 100 psig. Suitably, the gas employed comprises from about 0.5 to about 50 percent hydrogen, with the balance of the gas being substantially nonreactive or inert. Pure, or essentially pure, hydrogen is, of course, suitable but is quite expensive and therefore need not be used. The concentration of the hydrogen in the treating gas and the necessary duration of such treatment, and temperature of treatment, are interrelated, but generally the time of treating the catalyst with a gaseous mixture such as described ranges from about 0.1 hour to about 48 hours, and preferably from about 0.5 hour to about 24 hours, at the more preferred temperatures.

Subsequent to the reduction, and prior to the halogenation/water treatment, the reduced form of the catalyst is not to be contacted with a halogen-free, oxygen-containing gas at temperatures ranging in excess of about 775°F. Contact of the catalyst with oxygen, e.g., air or other gases of high oxygen concentration, at sufficient temperature will produce back-oxidation and agglomeration of the iridium to produce iridium oxide.

HALOGENATION

Prior to introduction of halogen, hydrogen may be purged from the reaction zone, if desired, suitably by use of a nonreactive or inert gas such as helium, nitrogen or flue gas. If desired, the catalyst bed can be dried, e.g., to less than 150 ppm water, based on the weight of the catalyst, as by contact with dry hydrogen at about 930°F. at periods ranging from 1 to about 22 hours. The halogenation step is then carried out, prior to contact with a substantially halogen-free, oxygen-containing gas at a temperature in excess of about 775°F., sequentially or simultaneously, by injecting water and halogen, or a halogen component which will decompose in situ and liberate halogen, e.g., chlorine, bromine, fluorine or iodine, in the desired quantities, into the reaction zone and into contact with the reduced catalyst. The halogen is generally introduced as free halogen, or as a gaseous mixture which contains free halogen, and preferably the halogen, or halogen-containing gaseous mixture is presaturated with the desired amount of water and then injected into the reforming zone and into contact with the catalyst at temperature ranging from about 550°F. to about 1150°F., sufficient to effect redispersion of the agglomerated metal, or metals. Preferably, temperatures range from about 850°F. to about 1150°F., and more preferably from about 900°F. to about 1000°F. The introduction is generally continued up to the point of halogen breakthrough, or point in time when halogen is emitted from the bed downstream of the location of entry where the halogen gas is introduced. The concentration of halogen is not critical, and can range, e.g., from a few parts per million to essentially pure halogen gas. Suitably, the halogen, e.g., chlorine, is introduced in a gaseous mixture wherein the halogen is contained in concentration ranging from about 0.01 mole percent to about 10 mole percent, and preferably from about 0.1 mole percent to about 3 mole percent. The concentration of water contained within the water-halogen mixture is critical and is preferably added in minimum concentration consistent with the desired objective of suppressing ferrous metal surface corrosion, and iron contamination.

Suitable halogen-containing materials for the purpose of this invention, added alone or in admixture with other materials, include free halogen, e.g., chlorine, bromine, fluorine, iodine, and the like, and including the hydrogen halides, e.g., hydrogen chloride, hydrogen bromide and halide precursors, e.g., halogen compounds of the type which thermally or oxidatively decompose in situ to liberate elemental halogen. Preferred halogen-containing compounds include organic halides such as alkyl and aryl mono- and poly-halides, as well as halogenated acids, aldehydes, ketones, etc. Suitable alkyl halides, for example, include methyl chloride, ethyl bromide, methyl chloroform, carbon tetrachloride, and the like. Preferred organic halides are those having a relatively high halogen content such as tetrahalide, e.g., carbon tetrachloride, etc., or a trihalide, e.g., chloroform, tertiary butyl chloride, or other polyhalide compounds such as methyl chloroform, perchloroethane, and the like.

After the initial reduction of the coke-depleted catalyst, care should be exercised to avoid exposing the reduced catalyst to a substantial halogen-free, oxygen-containing gas at a temperature in excess of about 775°F. Preferably, the redispersion process of this invention is completed and the catalyst returned to use without contacting the same (after the initial reduction operation) with a substantially halogen-free, oxygen-containing gas at a temperature in excess of about 775°F.

The invention will be more fully understood by reference to the following selected nonlimiting examples and comparative data which illustrate its more salient features. All parts are given in terms of weight except as otherwise specified.

In a series of runs described in detail hereafter, Inconel reactors are separately charged with partially agglomerated, inactivated platinum-iridium catalyst and carbon steel lathe turnings are placed at each reactor inlet. The Inconel reactors and steel turnings provide a controlled source of iron which simulates conditions found in a full size commercial reactor built of carbon steel. In an initial step, pure hydrogen is injected into a reactor, at conditions simulating those required to prereduce the metal components of the catalyst, as required in commercial practice. After the prereduction, the flow of hydrogen is discontinued. Dry chlorine is then injected into a first reactor, and chlorine and water are injected into a second reactor, the chlorine and water being added in varying concentrations so that the effect of the added water, as well as the effect of not adding water, can be determined. In the runs described by reference to Examples 1 through 8, where an admixture of chlorine and water are added, the desired amount of water to be added to the chloride is preintroduced with nitrogen, subsequent to which time the chlorine is cut in to provide an admixture of water and chlorine in desired ratio to the reaction. As will be shown in the examples, iron corrosion and iron carryover are readily suppressed in each instance when water is introduced in sufficient concentration with the chlorine, and yet the agglomerated metal is effectively redispersed. In fact, with multicycle treats, it is shown that the iridium agglomerates can be completely redispersed, and the catalyst thereby reactivated.

EXAMPLE 1

A pair of runs was made wherein each of two reactors were separately charged with 130 parts of 50+ percent agglomerated cokefree platinum-iridium catalyst (crystallite size metals >50A), and 5 parts of carbon steel lathe turnings, the latter charge being placed within an inlet leading into a reactor. The two reactors were then separately treated with pure hydrogen at temperature ranging 700°F. to 930°F. in an initial step to prereduce the catalyst, and the hydrogen then cut out of the reactor. The prereduced charges of catalyst were then treated with an admixture of 0.13 percent chlorine in nitrogen at 930°F., 100 psig, 25.3 SCF/Hr. for a period of 1 hour at which point in time chlorine breakthrough at the bed was achieved. In one of the runs, dry chlorine was added to a reactor (Reactor 1) while in the other (Reactor 2), wet nitrogen, sufficient to provide 4000 ppm total water, was added to the reactor for a period of 16 hours, after which time chlorine in concentration sufficient to provide 0.13 percent chlorine in nitrogen is then cut in, or additionally added, with the following results:

| Run | Description | % Iron Deposited on Catalyst | % Redispersion |
|---|---|---|---|
| Reactor 1 | 1 hr. treat with 0.13% $Cl_2$ in $N_2$ (system prereduced) | 0.42 | 54 |
| Reactor 2 | 1 hr. treat with 0.13% $Cl_2$ in wet $N_2$ (4000 ppm $H_2O$) (system prereduced) | 0.00 | 19 |

It is thus observed that iron corrosion and carryover was eliminated by injection of water, though the effectiveness of the redispersion is lessened. Thus, in Reactor 1, the agglomerates were 54 percent redispersed to crystallite sizes ranging below 50A, whereas in Reactor 2, the agglomerates were only 19 percent redispersed to crystallite sizes ranging below 50A. In the best mode of practicing the invention, it was found desirable to add only sufficient water to achieve the desired suppression of iron corrosion and carryover, without additional water since the rate of redispersion was found to be adversely affected, and the rate of retardation was found to increase with increasing concentrations of water.

EXAMPLES 2-8

A series of runs was made to define the minimum water level needed to suppress iron corrosion and carryover. These runs were made at various $Cl_2$ and $H_2O$ concentrations. In the front of each Inconel reactor was placed the usual 5 parts by weight charge of iron filings, and 130 parts by weight of the prereduced, cokefree, agglomerated platinum-iridium catalyst, at the conditions of the preceding example, and iron carryover was determined as the percent of the original iron filings found on the catalyst after the chlorine treat. One run was conducted, for reference, wherein no water, but only chlorine, was added (Run No. 1), three runs were conducted wherein water was preintroduced into the reactor, with nitrogen, for periods ranging from 1 to 24 hours prior to, or in advance of, the introduction of the wet chlorine into the reactor (Run Nos. 2–4), and four runs were conducted wherein water, with nitrogen, was preintroduced into the reactor for a period of only about 5 to 15 minutes prior to initiation of the run (Run Nos. 5–8) wherein an admixture of water and chlorine was added, with the following results:

| Run No. | Zero Water Addition $H_2O/Cl_2$ Molar Ratio | %Iron Carryover |
|---|---|---|
| 1 | 0.0 | 10.6 |
| | Long Water Preaddition Period | |
| 2 | 0.4 | 12.2 |
| 3 | 0.6 | 0.0 |
| 4 | 3.0 | 0.0 |
| | Short Water Preaddition Period | |
| 5 | 0.95 | 2.0 |
| 6 | 1.05 | 2.8 |
| 7 | 1.4 | 0.0 |
| 8 | 1.45 | 0.2 |

From these data it will thus be observed that relatively low values for $H_2O/Cl_2$ ratios suppress iron carryover if long (1–24 hours) water preaddition periods (time period of water introduction prior to time that the mixture of water and chlorine is added) are used. There appears to be a very sharp change in iron carryover between $H_2O/Cl_2$ molar ratio of about 0.4 and 0.6. If shorter water preaddition periods (5–15 min.) are used, an $H_2O/Cl_2$ molar ratio of about 1.4 appears optimum to assure no iron carryover.

EXAMPLES 9-14

An additional series of runs was made with long water preaddition periods, as described above, to learn more of the iron corrosion and carryover problem utilizing a TBA instrument (Mettler Vacuum Recording Thermal Gravimetric Analyzer, Model TA-1). A carbon steel bar was placed in the instrument, in a first run, and heated to 930°F. in hydrogen. A stream of dry 1% chlorine in nitrogen was passed over the sample and weight loss versus time was recorded. A second run was then made, over the same time period, wherein water was continuously added, and the concentration of water incrementally increased, as tabulated below, until iron carryover ceased. The recorded data are as follows:

| Time Period (Hrs.) | Iron Loss (Grams) No Added Water | Added Water (ppm) | Iron Loss (Grams) with Added Water |
|---|---|---|---|
| 0.0 | 0.000 | 0.000 | 0.000 |
| 0.5 | 0.040 | 2000 | 0.036 |
| 1.0 | 0.080 | 4000 | 0.074 |
| 1.5 | 0.120 | 6000 | 0.098 |
| 2.0 | 0.160 | 8000 | 0.095 |
| 2.5 | 0.200 | 10,000 | 0.094 |

It is thus shown that iron carryover is stopped between 4000 and 6000 ppm water, this corresponding to a molar ratio of water:chlorine ranging between about 0.4:1 and 0.6:1.

EXAMPLE 15

Another series of runs was made, corresponding to those described by reference to Examples 9–14, except that in this instance 0.2 percent chlorine was employed and water, where injected, was injected each half-hour period from time zero, in concentrations of "0" water, 400 ppm, 800 ppm, 1200 ppm, and 1600 ppm, respectively. These data are tabulated as follows:

| Time Period (Hrs.) | Iron Loss (Grams) No Added Water | Added Water (ppm) | Iron Loss (Grams) with Added Water |
|---|---|---|---|
| 0.0 | 0.00 | 0.00 | 0.000 |
| 0.5 | 0.060 | 400 | 0.060 |
| 1.0 | 0.012 | 800 | 0.011 |
| 1.5 | 0.018 | 1200 | 0.011 |
| 2.5 | 0.032 | — | — |

In this instance, iron carryover was stopped at 800 ppm $H_2O$. From these data, it thus appears that iron carryover is stopped at an $H_2O/Cl_2$ molar ratio ranging between 0.4–0.6.

EXAMPLES 16–19

An additional series of runs was made to show that a higher rate of redispersion of iridium agglomerates can be achieved by drying a bed of the iridium-containing catalyst after the hydrogen prereduction step, and prior to the treatment with wet chlorine vis-a-vis the treatment of a similar bed of catalyst at identical conditions except that the bed was not dried prior to treatment with the wet chlorine. In each type of run, a single cycle of treatment (i.e., prereduction with hydrogen and subsequent treatment with chlorine to the point of chlorine breakthrough), followed by another cycle, or cycles of treatment, showed that multiple cycle treatments could be employed, whether or not the bed of catalyst was dried prior to chlorine treatment, to completely redisperse the agglomerates and reactivate the catalyst. These runs, along with runs made with identical catalyst at identical conditions, except that dry chlorine only was used to redisperse the agglomerates on the catalyst, without the intermediate step of drying the catalyst bed, are also presented, in data given in the table below, to provide a comparative basis for the effectiveness of redispersion using the different techniques.

Portions of coke-free platinum-iridium catalyst sixty percent agglomerated (crystallite size of metals >50A), except as otherwise indicated, were thus prereduced with pure hydrogen in the manner and at the conditions described by reference to the foregoing examples. The prereduced portions of catalyst, in the series of runs described, are treated with dry or wet chlorine, with or without intermediate drying of the catalyst bed at 930°F. and at 100 psig. The percent of redispersion of these several portions of catalyst, subsequent to the completion of a series of one, two and three cycles of treatment to the point of chlorine breakthrough is as tabulated below:

| Percent Redispersion at End of: | Dry Chlorine (No Drying between Stages) | Wet Chlorine $H_2O/Cl_2 =$ 2000 ppm/1400 ppm with $H_2$ Drying between Each Cycle | Wet Chlorine $H_2O/Cl_2 =$ 2000–4000 ppm/ 1300 ppm - No Drying between Each Cycle |
|---|---|---|---|
| Cycle No. 1 | 50.0 | 42.5 (Est.) | 30.0 |
| Cycle No. 2 | 100.0 | 70.0[1] | 70.0[2] |
| Cycle No. 3 | — | 100.0 (Est.) | 100.0[3] |

[1] Catalyst was 40 percent agglomerated prior to initiation of run. This point was established by averaging three runs.
[2] This point was established by averaging two runs.
[3] Catalyst was 40 percent agglomerated prior to initiation of run.

These data thus show that intermediate drying of the catalyst bed provides a higher rate of dispersion than a totally wet procedure (without catalyst drying). However, since it is generally desirable to completely redisperse the agglomerated metal, a three-cycle treat without intermediate drying is equally as suitable as a procedure which utilizes an intermediate drying step. The intermediate drying step may thus be preferable in those instances where complete redispersion of the agglomerates is not required. However, where complete dispersion is desired, there is no necessity, in most situations, to practice intermediate drying.

In the practice of this invention, suitably, the metal hydrogenation-dehydrogenation components are composited with mildly or moderately acidic refractory inorganic oxides which are employed as supports, e.g., silica, silica-alumina, magnesia, thoria, boria, titania, zirconia, various spinels and the like, including in particular alumina which is preferred. High surface area catalysts, or catalysts having surface areas ranging upwardly from about 100 square meters per gram are preferred. In particular, catalysts having surface areas ranging from about 300 to about 600 square meters per gram prove quite satisfactory.

In formation of the more active catalysts, porous refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3 inch average diameter. The material can then be treated by contact with a solution containing the desired amount of a metal hydrogenation-dehydrogenation component, or components, e.g., iridium or iridium and platinum, or treated sequentially by contact with a solution containing one metal and then the other in the desired amounts. On the other hand, larger particles can be so treated and then crushed to the desired size. The particulate mass, in either instance, can be dried, calcined, and contacted with hydrogen, in situ or ex situ, to reduce the salt. Suitably, also, the catalyst composite can be formed by adding together suitable reagents such as salts of platinum and/or iridium, along or in admixture with other metals, and ammonium hydroxide or ammonium carbonate, and a salt of alumina such as aluminum chloride or aluminum sulfate to form aluminum hydroxide. The aluminum hydroxide containing the salts of platinum and/or iridium, alone or in admixture with other metals, can then be heated, dried, and simultaneously converted to alumina, impregnated with platinum and/or iridium, and other salts. The material can then be calcined and then hydrogen-treated, in situ or ex situ, to reduce the salts and complete the formation of the catalyst composite.

Reforming, i.e., the on-oil portion of an operating cycle, is conducted at temperatures ranging from about 600° to about 1050°F., and preferably at temperatures ranging from about 850° to about 1000°F. Pressures range generally from about 50 to about 750 psig., and preferably from about 100 to about 250 psig. The reactions are conducted in the presence of hydrogen to suppress side reactions normally leading to the formation of unsaturated carbonaceous residues, or coke, which causes deactivation of the catalyst. The hydrogen rate, once-through or recycle, is generally within the range of from about 1000 to about 10,000 SCF/Bbl., and preferably within the range of from about 2000 to about 5000 SCF/Bbl. The feed stream, in admixture with hydrogen, is passed over the catalyst at space velocities ranging from about 0.1 to about 25 W/W/Hr., and preferably from about 1.0 to about 5.0 W/W/Hr.

It is apparent that various modifications can be made in the conditions of operation, the precise amount of water added, the time period of pre-water addition to the reaction zone prior to use of the wet halogen, and the like, without departing the spirit and scope of the invention.

Having described the invention, what is claimed is:

1. In a process for reactivating a reforming catalyst, which includes an iridium component composited with a refractory porous inorganic oxide, previously inactivated by coke deposition thereon during contact with a hydrocarbon feed at hydrocarbon conversion conditions and subsequently regenerated by burning at elevated temperatures in the presence of oxygen containing gases to remove accumulated coke deposits therefrom, the improved combination which comprises:
contacting, without interim contact with a substantially halogen-free, oxygen-containing gas at temperatures in excess of about 775°F., a bed of the coke-depleted catalyst in a cycle which includes, in sequence, the steps of
i. contacting the coke-depleted catalyst with hydrogen or a hydrogen-containing gas at a temperature sufficient to reduce the said iridium component and then
ii. contacting said reduced catalyst at an elevated temperature from about 550°F to about 1150°F in a reaction zone provided with exposed ferrous metal surfaces with a gas comprising elemental halogen or halogen precursor and water in amount ranging from about 0.1:1 to 15:1 molar ratio of water:halogen, in a non-oxygen containing atmosphere, sufficient to suppress corrosion of the ferrous metal surfaces of the reaction zone and to effect redispersion of the iridium.

2. The process of claim 1 wherein the water and halogen are added to the reaction zone in concentration ranging from about 1:1 to 2:1 molar ratio of water:halogen.

3. The process of claim 2 wherein the molar ratio of water:halogen ranges from about 0.4:1 to about 3.0:1.

4. The process of claim 1 wherein water is preintroduced into the reaction zone prior to the introduction of the admixture of halogen and water into the reaction zone.

5. The process of claim 4 wherein the molar ratio of the water:halogen admixture ranges from about 1:1 to about 2:1.

6. The process of claim 4 wherein the molar ratio of the water:halogen admixture ranges from about 1.2:1 to about 1.6:1.

7. The process of claim 1 wherein the halogen is chlorine.

8. In a process for reactivating reforming catalyst, comprised of halogen and iridium composited with a refractory porous inorganic oxide, previously inactivated by coke deposition thereon during contact with a hydrocarbon feed at reforming conditions, and subsequently contacted with oxygen at an elevated temperature to burn accumulated coke deposits therefrom, a method for reactivating said coke depleted catalyst by contacting a bed of the said coke-depleted catalyst without intermediate contact with a substantially halogen-free, oxygencontaining gas at temperatures in excess of about 775°F., which includes the sequence of steps comprising
i. contacting said coke-depleted catalyst in a reaction zone with hydrogen or a hydrogen-containing gas at an elevated temperature for a time sufficient to reduce at least a portion of the iridium of said catalyst to its metallic state;
ii. contacting said reduced catalyst at an elevated temperature from about 550°F to about 1150°F in a reaction zone, in a non-oxygen atmosphere, with a gas comprising elemental halogen or elemental halogen precursor and water in concentration ranging from about 0.1:1 to 15:1 molar ratio of water:halogen to effect redispersion of the iridium;
iii. contacting said treated catalyst from step (ii) in said reaction zone, with hydrogen or a hydrogen-containing gas at an elevated temperature for a time sufficient to further reduce at least a portion of said iridium to its metallic state; and
iv. contacting said treated catalyst from step (iii) in said reaction zone, in a non-oxygen-atmosphere with a gas comprising elemental halogen or elemental halogen precursor and water at an elevated temperature from about 550°F to about 1150°F in concentration ranging from about 0.1:1 to 15:1 molar ratio of water:halogen to effect redispersion of the iridium.

9. The process of claim 8 wherein the water and halogen are added to the reaction zone in steps (ii) and (iv) in concentration ranging from about 1:1 to to 2:1 molar ratio of water:halogen.

10. The process of claim 9 wherein the molar ratio of water:halogen ranges from about 0.4:1 to 3.0:1.

11. The process of claim 8 wherein the water and halogen are admixed prior to the introduction of these components into the reaction zone.

12. The process of claim 11 wherein the molar ratio of water:halogen in the admixture ranges from about 1:1 to about 2:1.

13. The process of claim 11 wherein the molar ratio of water:halogen ranges from about 1.2:1 to about 1.6:1.

14. The process of claim 8 wherein the halogen is chlorine.

15. The process of claim 8 wherein the catalyst is comprised of a composite of iridium and platinum.

16. In a process for reactivating a reforming catalyst, comprised of halogen and iridium composited with a refractory porous inorganic oxide, previously inactivated by coke deposition thereon during contact with a hydrocarbon feed at reforming conditions, and subsequently contacted with oxygen at an elevated temperature to burn accumulated coke deposits therefrom, a method for reactivating said coke-depleted catalysts by
   contacting a bed of the said coke-depleted catalyst in a plurality of cycles without intermediate contact with a substantially halogen-free, oxygen-containing gas at temperatures in excess of about 775°F., a cycle of which includes the sequence of steps comprising
   i. contacting said coke-depleted catalyst in a reaction zone with hydrogen or a hydrogen-containing gas at an elevated temperature for a time sufficient to reduce at least a portion of the iridium of said catalyst to its metallic state; and then
   ii. contacting said reduced catalyst at an elevated temperature from about 550°F to about 1150°F in a reaction zone, in a non-oxygen containing atmosphere, with a gas comprising elemental halogen or elemental halogen precursor and water in concentration ranging from about 0.1:1 to 15:1 molar ratio of water:halogen up to, but not substantially beyond, the point of halogen breakthrough to effect redispersion of the iridium.

17. The process of claim 16 wherein the water and halogen are added to the reaction zone in step (ii) in concentration ranging from about 1:1 to 2:1 molar ratio of water:halogen.

18. The process of claim 17 wherein the molar ratio of water:halogen ranges from about 0.4:1 to 3.0:1.

19. The process of claim 16 wherein the water and halogen are admixed prior to introduction of these components into the reaction zone.

20. The process of claim 16 wherein the molar ratio of water:halogen ranges from about 1.2:1 to about 1.6:1.

21. The process of claim 16 wherein the halogen is chlorine.

22. The process of claim 16 wherein the catalyst is comprised of a composite of iridium and platinum.

23. The process of claim 16 wherein the catalyst is treated in a series of from 2 to about 5 cycles of said sequential hydrogen reduction and halogenation treatments.

* * * * *